United States Patent [19]
Flatin et al.

[11] Patent Number: 5,426,414
[45] Date of Patent: Jun. 20, 1995

[54] ENHANCED AUXILIARY SIGNALING DEVICE

[76] Inventors: Jerry Flatin, 719 N. 20th St., Grand Forks, N. Dak. 58203; Dale T. Legacie, P.O. Box 71, Fisher, Minn. 56723

[21] Appl. No.: 150,694

[22] Filed: Nov. 10, 1993

[51] Int. Cl.⁶ .................................................. B60Q 1/00
[52] U.S. Cl. ................................. 340/472; 340/464; 340/471; 340/475; 340/480; 340/483; 340/485; 116/28 R; 116/42
[58] Field of Search ............... 340/464, 465, 471, 472, 340/475, 480, 481, 482, 483, 484, 485; 116/28 R, 42

[56] References Cited

U.S. PATENT DOCUMENTS

| | | | |
|---|---|---|---|
| 1,952,133 | 3/1934 | Kovacs | 340/484 |
| 4,361,828 | 11/1982 | Hose | 340/472 |
| 4,622,494 | 11/1986 | Johnson | 340/472 |
| 4,631,516 | 12/1986 | Clinker | 340/472 |
| 4,928,084 | 5/1990 | Reiser | 340/471 |
| 5,053,746 | 10/1991 | Taneo | 340/480 |

*Primary Examiner*—John K. Peng
*Assistant Examiner*—Edward Lefkowitz
*Attorney, Agent, or Firm*—Zarley, McKee, Thomte, Voorhees & Sease

[57] ABSTRACT

The enhanced auxiliary signaling device of the present invention includes a housing mounted on the rear of a vehicle with a control unit electrically connected to the vehicle electrical system and to a display panel on the housing to display various alphanumeric and graphic messages in response to activation of signals in the vehicle electrical system. The activation of a vehicle turn signal will cause a first alphanumeric message to be displayed along with a first graphic display. The second turn signal will display the first alphanumeric message along with a second graphic display. Activation of both turn signals will activate a second alphanumeric message, simultaneous with the first and second graphic displays. The activation of the vehicle brakes will activate a second alphanumeric message and a third graphic display. The control unit includes a microprocessor which prioritizes message displays, such that only a signal alphanumeric message display is displayed simultaneous with one or more graphic displays.

6 Claims, 3 Drawing Sheets

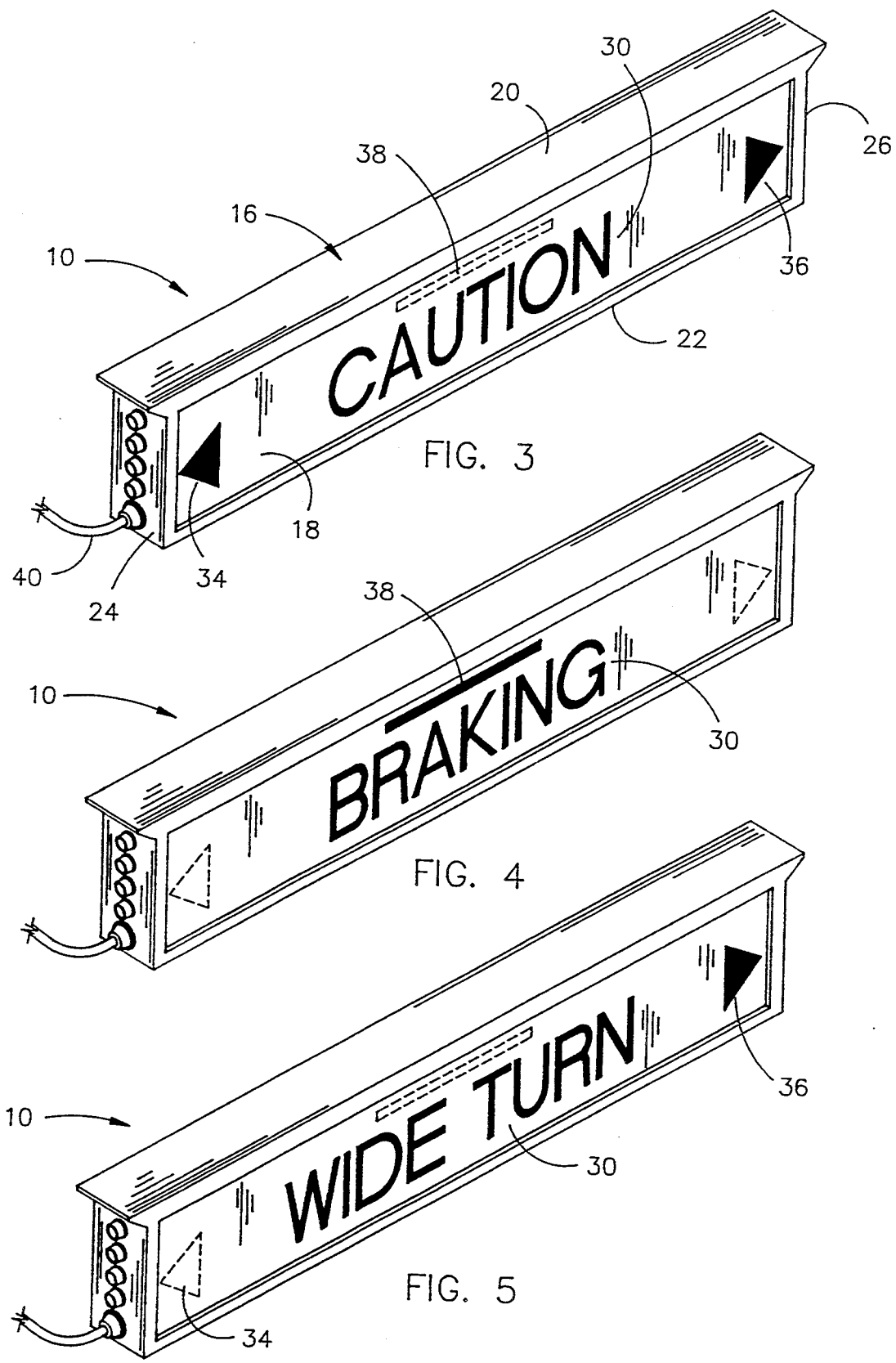

ENHANCED AUXILIARY SIGNALING DEVICE

TECHNICAL FIELD

The present invention relates generally to warning signs, and more particularly to an improved auxiliary signaling device mounted on the rear of a vehicle and connected to its electrical system.

BACKGROUND OF THE INVENTION

Various long length commercial vehicles, such as tractor-trailer combinations, buses, trucks, recreational vehicles, and the like, present potentially hazardous situations to persons following behind these vehicles. Because of the dimensions of the commercial vehicle, it is common for long length commercial vehicles to swing wide in rounding a corner.

While various devices are currently utilized to assist in warning trailing vehicles of the movements of a commercial vehicle, such apparatus are typically ineffective or confusing. For example, some semi-trailers utilize turn signal lights located on the underside of the trailer in a central location. However, these lights are only noticeable when the following vehicle is in the truck operator's blind spot, immediately adjacent the trailer. Thus, the following vehicle is located for a potential collision upon movement of the tractor-trailer into the signaled turn.

Most large commercial vehicles must utilize a rapid sequence of brake applications when downshifting. These brake applications can easily be mistaken for hazard flashers to a following vehicle.

Another method for warning following vehicles of potentially hazardous situations, includes the use of printed signs on the back of the commercial vehicle. Such signs are limited in effectiveness for several reasons. First, the signs are frequently placed above the normal line of sight for automobile drivers, and therefore are not easily noticed. In addition, the signs can include diagrams which are difficult to understand, and which are easily covered with dirt and road grime, making them difficult to read.

Because buses tend to make sudden and frequent stops, it is difficult for following vehicles to determine whether the bus is braking, or whether the bus is utilizing hazard flashers.

SUMMARY OF THE INVENTION

It is therefore a general object of the present invention to provide an improved auxiliary signal device for the rear of commercial vehicles to warn following traffic of various potential hazards.

Another object of the present invention is to provide an auxiliary signal device which will alert following traffic of the specific action being taken by the commercial vehicle.

Yet another object of the present invention is to provide an auxiliary signal device which will distinguish between braking, backing, turning and hazard flashers.

A further object is to provide an auxiliary signal device which is simple and economical to manufacture, and refined in appearance.

These and other objects will be apparent to those skilled in the art.

The enhanced auxiliary signaling device of the present invention includes a housing mounted on the rear of a vehicle with a control unit electrically connected to the vehicle electrical system and to a display panel on the housing to display various alphanumeric and graphic messages in response to activation of signals in the vehicle electrical system. The activation of a vehicle turn signal will cause a first alphanumeric message to be displayed along with a first graphic display. The second turn signal will display the first alphanumeric message along with a second graphic display. Activation of both turn signals will activate a second alphanumeric message, simultaneous with the first and second graphic displays. The activation of the vehicle brakes will activate a second alphanumeric message and a third graphic display. The control unit includes a microprocessor which prioritizes message displays, such that only a signal alphanumeric message display is displayed simultaneous with one or more graphic displays.

BRIEF DESCRIPTION OF THE DRAWINGS

FIG. 3 is a perspective view of the auxiliary signal device showing a first type of warning;

FIG. 4 is a view similar to FIG. 3, showing a second type of warning;

FIG. 5 is a view similar to FIG. 3, showing a third type of warning;

DESCRIPTION OF THE PREFERRED EMBODIMENT

Figure 1:
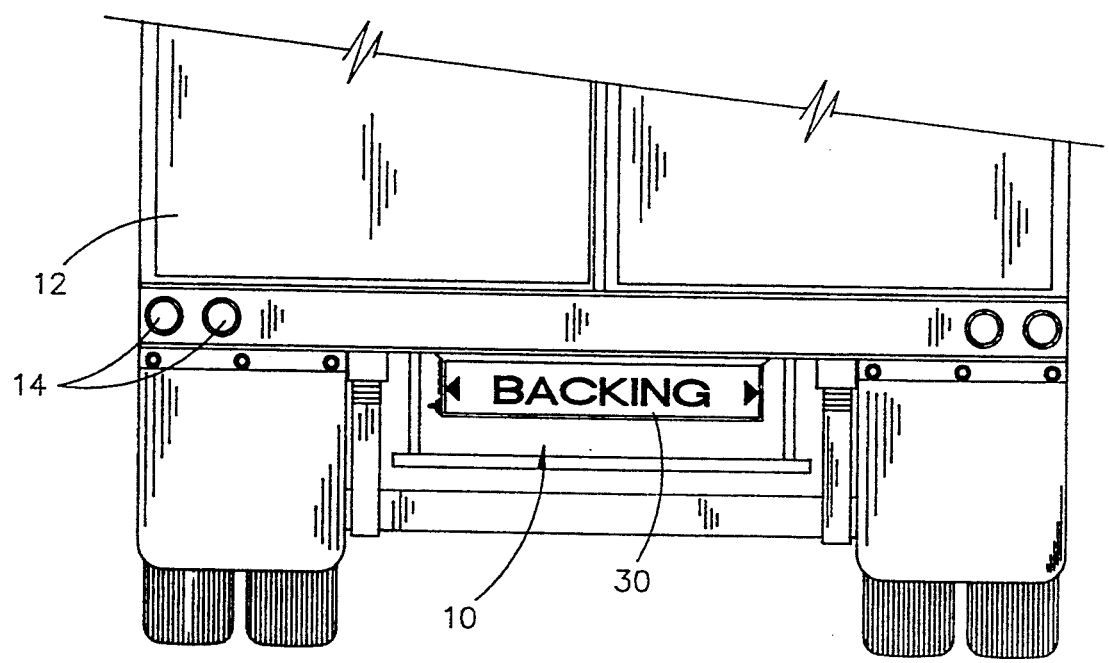
FIG. 1 is a rear elevational view of a semi-trailer with the auxiliary signal device of the present invention installed thereon.

Referring now to the drawings, in which similar or corresponding parts are identified with the same reference numeral, and more particular to FIG. 1, the auxiliary signal device of the present invention is designated generally at 10 and is shown mounted on the rearward end of a conventional semi-trailer 12. Preferably, signal device 10 is mounted to trailer 12 at a height approximately the same as the trailer tail lights 14.

Figure 2:
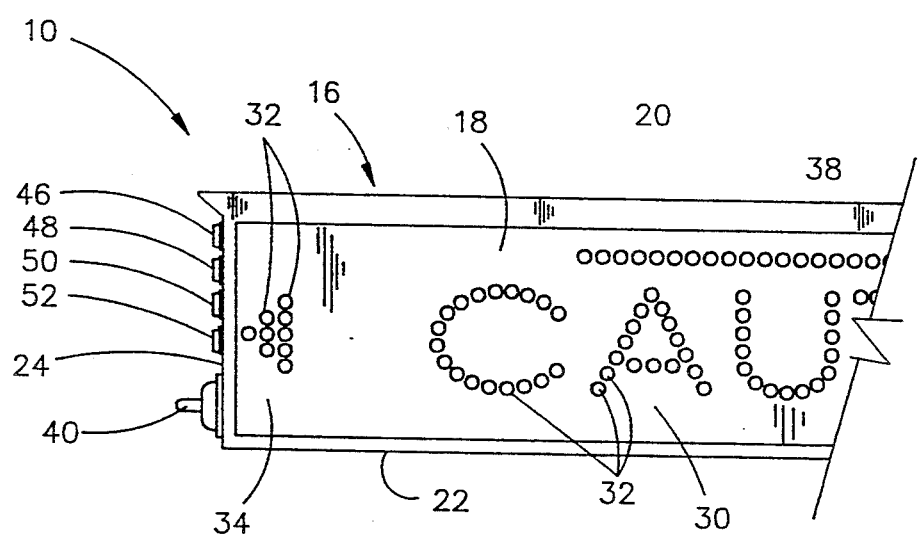
FIG. 2 is an enlarged front elevational view of a portion of the auxiliary signal device of the present invention.

As shown in FIGS. 2 and 3, auxiliary signal device 10 includes a generally rectangular housing 16 having a forward display panel 18, top and bottom walls 20 and 22, end walls 24 and 26, and back panel 28 (not shown). As shown in FIG. 2, a central message display area 30 includes a plurality of small lights 32 which may be selectively illuminated to form letters for words or phrases. A left arrow display area 34 has a plurality of lights 32 formed in the shape of a triangle or arrow pointing to the left. A right arrow display area 36 (shown in FIG. 3) has a plurality of lights arranged to form an arrow pointing to the right. An upper display area 38 includes a plurality of lights formed into a generally horizontally oriented elongated bar, located immediately above the message display area. While the various display areas 30, 34, 36 and 38 are shown utilizing a plurality of individual lights, various other methods for producing the desired illuminated area could be utilized, such as LEDs, liquid crystal, or the like.

An electrical cord 40 extends from the interior of housing 16 through left end wall 24 to the electrical system of the vehicle, for connection thereto. A control unit within housing 16 includes a separate power source, such as a battery, to independently power the auxiliary signal device 10. Control unit 42 is designed to activate predetermined display areas 30, 34, 36 and 38 in response to the activation of various circuits of the vehicle electrical system.

More specifically, control unit 42 will activate both arrow display areas 34 and 36 simultaneously with a preprogrammed message in the message display area 30, as shown in FIG. 3. In the embodiment shown in FIG. 3, the word CAUTION has been programmed into the control unit as the appropriate message to be displayed. Message display area 30 and arrow display areas 34 and 36 will flash alternately, and in sequence with the conventional four-way hazard lights on the vehicle.

Activation of the right turn signal of the vehicle will cause control unit 42 to activate the right arrow display area 36 and a preprogrammed message on message display area 30, in sequence with the flashing of the turn signal. As shown in FIG. 5, the message "WIDE TURN" has been programmed for display during activation of one of the turn signals. Activation of the vehicle left turn signal would cause the same "WIDE TURN" message to be displayed on message display area 30 with left arrow display area 34.

Application of the brakes on the vehicle will cause control unit 42 to illuminate upper display area 38 simultaneously with a "BRAKING" message in message display area 30, as shown in FIG. 4.

Placing the vehicle into reverse gear will cause control unit 42 to display the phrase "BACKING" in message display area 30 as shown in FIG. 1.

Figure 7:
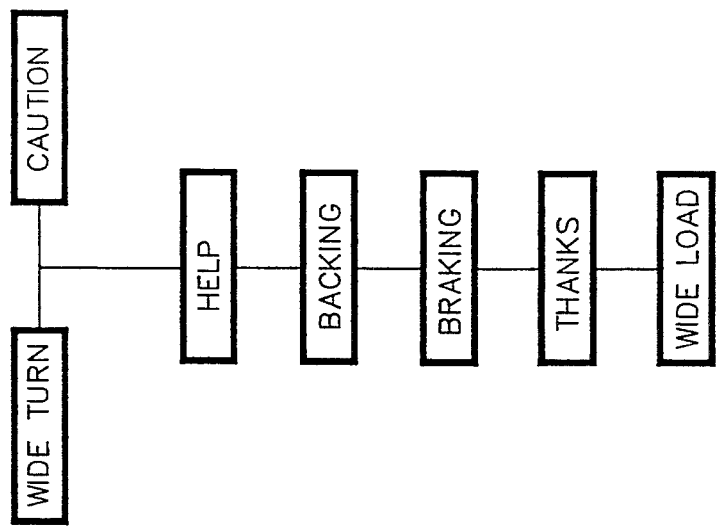
FIG. 7 is a flow chart showing message display hierarchy.

Control unit 42 is preferably programmed to give certain messages priority within the message display area 30, as shown in FIG. 7. For example, both the "WIDE TURN" and "CAUTION" messages will be given priority over the "BRAKING" message, but will not override the illumination of upper display area 38. In this way, following traffic will view a display which shows the braking bar (upper display area 38) in combination with the "WIDE TURN" message and a single arrow (left or right display areas 34 or 36), or will display the "CAUTION" in combination with both arrows of both display areas 34 and 36. Each message phrase within message display area 30 preferably includes a corresponding graphic depiction of the message display, utilizing left and right display areas 34 and 36, or upper display area 38.

Figure 6:
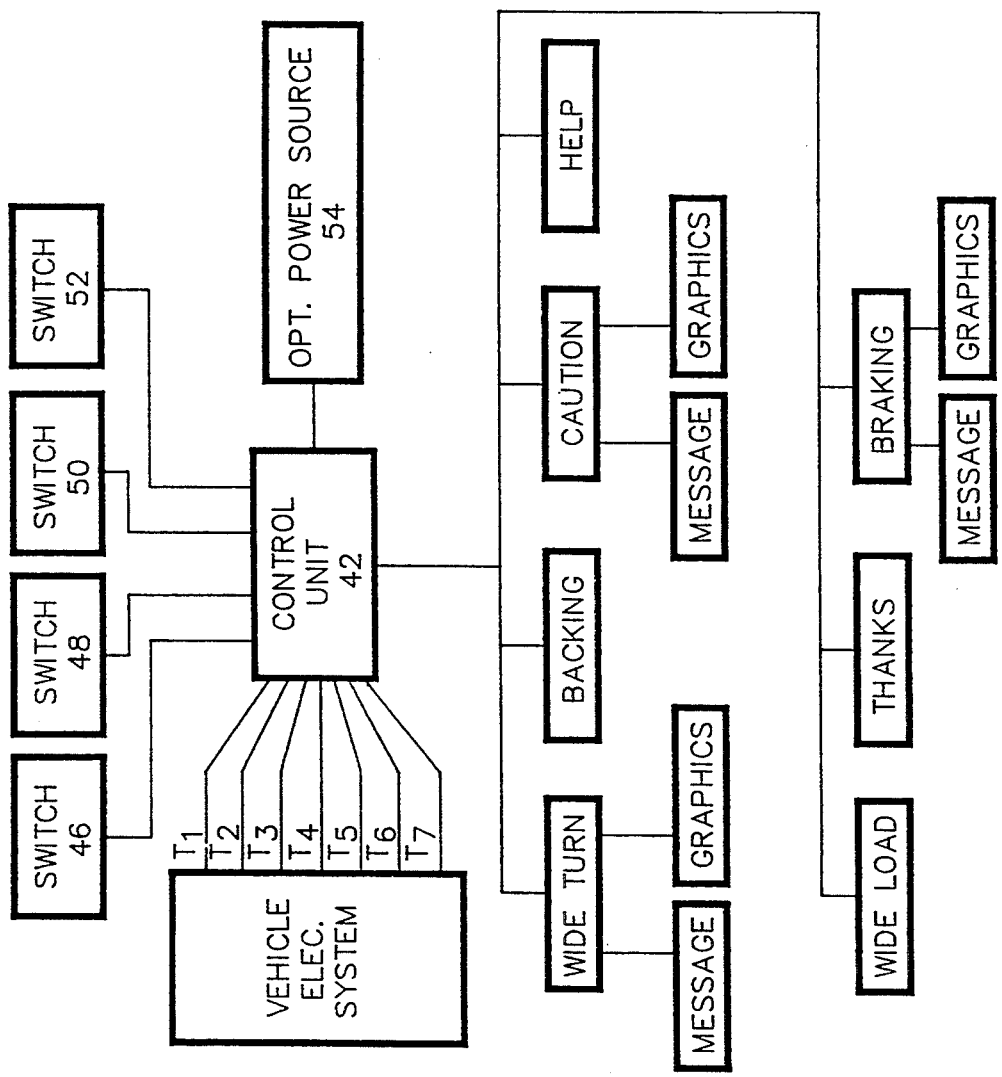
FIG. 6 is a schematic diagram showing connection of the invention to a conventional vehicle electrical system.

In addition, a "THANKS" message is preferably provided for those times when the vehicle is passing another vehicle, as shown in FIGS. 6 and 7. Conventionally, a truck will flash its running lights as a sign of thanks. The "THANKS" message is merely an enhancement to the conventional signal.

Four sealed switches 46, 48, 50 and 52 are mounted on left end wall 24, as shown in FIG. 2. Switches 46–52 are electrically connected to control unit 42 within housing 16, and will activate a preprogrammed message within message display area 30. For example, switch 46 may display a "LONG LOAD" message, switch 48 may display a "WIDE LOAD", switch 50 may display an "IN TOW" message, and switch 52 may display a "HELP" message. Obviously, any other message may be preprogrammed for display by 0 the unit. Control unit 42 is programmed such that the message displayed by one of switches 46–52 is displayed continuously, but only during those periods of time when one of the four messages associated with the corresponding graphic display areas 34, 36, and 38 is not activated. Thus, if switch 46 is placed in on the "on" position, a message such as "LONG LOAD" would be displayed on display panel 16 until such time as the vehicle activated its hazard lights, braked, activated a turn signal, or placed the vehicle in reverse gear. Upon taking any one of those four actions, control unit 42 would override the message displayed by switch 46 so as to display the message associated with one of the four above described actions.

The only exception to this rule is in the case of the "HELP" message, which takes priority over the "BACKING", "BRAKING", "THANKS" and "WIDE LOAD" messages. This is because the "HELP" message would only be utilized when the vehicle is stopped and the hazard lights are switched on.

As noted above, the auxiliary signal device 10 of the present invention utilizes the existing trailer wiring, connected through cord 40 to control unit 42, as shown in FIG. 6. Control unit 42 is also programmed so as to disable the auxiliary signal device 10 in the event of a malfunction, while allowing the lighting system of the vehicle to be maintained. Thus, a defect or malfunction in the auxiliary signal device 10 will have no affect on the electrical systems of the vehicle.

Referring now to FIG. 6, a schematic diagram showing the connection of the auxiliary signal device 10 to a conventional truck electrical system is shown. Control unit 42 is a conventional microprocessor which is electrically connected to the truck electrical system through seven terminals T1-T7. Terminal T1 is connected to the left turn signal of the vehicle, T2 is connected to the right turn signal, T3 is connected to the vehicle's ground, T4 is connected to the vehicle's auxiliary power unit, T5 is connected to the vehicle's brake lights, T6 is connected to the running lights, and T7 is connected to the vehicle's backup or reverse indicator. FIG. 6 shows an optional power source 56 which may supply power to control unit 42 in the event that the truck electrical system has no auxiliary power line T4.

Switches 46, 48, 50 and 52 are connected to control unit 42 so as to activate optional message displays, as described hereinabove. Control unit 42 detects an electrical signal from the truck electrical system, and switches 46–52, and then determines the appropriate message and/or graphics to display on the signaling device 10. With respect to message displays, control unit 42 incorporates the hierarchy described in FIG. 7 to determine the appropriate message to be displayed in the event that more than one signal is received from the truck electrical system.

Whereas the invention has been shown and described in connection with the preferred embodiment thereof, it will be understood that many modifications, substitutions and additions may be made which are within the intended broad scope of the appended claims. There has therefore been shown and described an improved auxiliary signaling device which accomplishes at least all of the above stated objects.

I claim:

1. An auxiliary signaling device for electrical connection to a vehicle's electrical system, comprising:
   a housing with means for attaching the housing to the rear of the vehicle;
   a control unit within said housing having means for electrically connecting the unit to the electrical system of the vehicle;

said housing including a display panel with visual display means responsive to electrical signals from said control unit;

said control unit responsive to signals from said vehicle electrical system to activate visual message displays on said display panel;

said visual message displays including:

a first alphanumeric message displayed in response to a signal caused by the activation of one of two vehicle turn signals; and a second alphanumeric message displayed in response to a signal caused by the activation of vehicle brakes;

said control unit including a microprocessor programmed to prioritize said alphanumeric messages, to display only one of said alphanumeric messages in the event that more than one signal is received from the vehicle electrical system; said visual message displays further including a first graphic displayed in response to a signal caused by the activation of a first of two vehicle turn signals, said first graphic displayed independently of the display of any of said alphanumeric messages.

2. The device of claim 1, further comprising a third alphanumeric message displayed in response to the activation of vehicle hazard lights.

3. The device of claim 2, further comprising a fourth alphanumeric message displayed in response to the activation of a reverse gear of the vehicle.

4. The device of claim 1, further comprising a second graphic display displayed in response to a signal caused by the activation of a second of two vehicle turn signals, said second graphic display displayed independently of the display of any of said alphanumeric messages.

5. The device of claim 4, wherein said first and second graphic displays are both displayed in response to the activation of vehicle hazard lights.

6. The device of claim 5, further comprising a third graphic display displayed in response to a signal caused by the activation of the vehicle brakes, said third graphic display displayed independently of the display of any of said alphanumeric messages and independently of the display of any other of said graphic displays.

* * * * *